United States Patent Office 3,446,350
Patented May 27, 1969

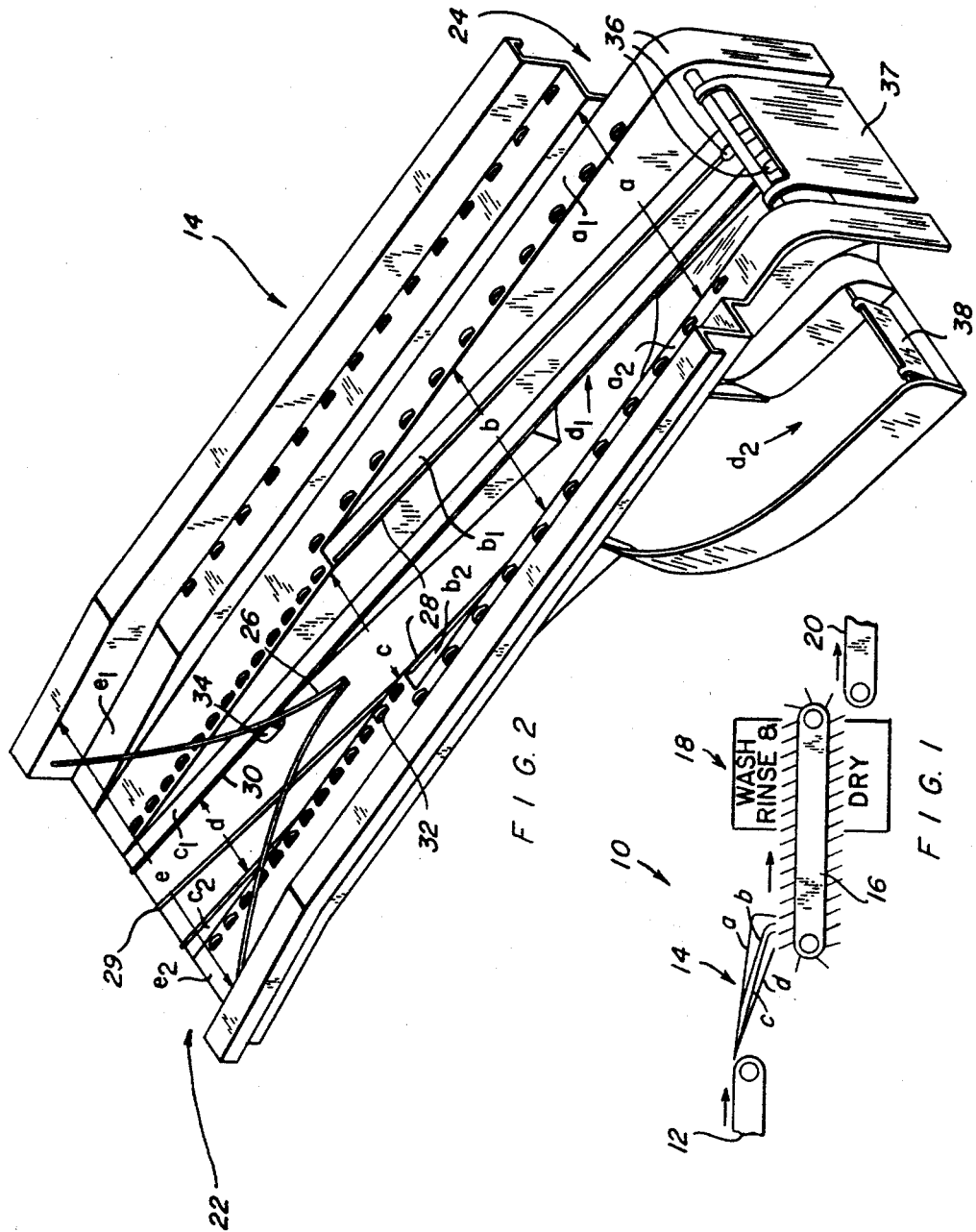

3,446,350
SORTER AND FEEDER FOR DISHWASHING MACHINES
William Winning Lowrie, 6 Seymour Crescent, St. Albert, Alberta, Canada
Filed July 13, 1966, Ser. No. 565,008
Int. Cl. B07b 13/06; B07c 5/06
U.S. Cl. 209—97                                10 Claims

ABSTRACT OF THE DISCLOSURE

A sorting apparatus which can sort generally disc-shaped articles such as chinaware according to size, having a number of paths of different widths and branching from a feed surface, arranged in such a manner as to effect gradual separation of the various groups of articles without sudden dropping of any of these articles during the separation.

The present invention relates to apparatus for sorting discrete articles according to their sizes and in particular to sorting apparatus capable of effecting gradual separation of discrete articles into different size ranges without damaging relatively fragile items such as dishes. The following description relates particularly to sorting apparatus adapted for use in connection with large, continuous conveyor dishwashing machines although it should be appreciated that sorting apparatus according to the present invention may find a variety of other applications.

In large establishments, dishwashing units capable of handling loads in excess of 30,000 pieces daily are frequently used and units handling loads up to 80,000 pieces per day are not uncommon. Such capacity requires an extensive and complex conveyor system leading from the dining areas to the dishwasher conveyor.

The dishwasher conveyor is generally in the form of an endless rack for receiving the larger items in a generally upright position, for instance at a 65° angle from the horizontal so as to allow the washing and rinsing sprays to reach both sides thereof and to facilitate the air-drying operation. Consequently the articles received from the main conveyor system must be sorted and then placed on the dishwasher conveyor; this creates a problem especially when dealing with articles of a wide range of shapes and sizes due to the fragility of some of them.

Prior to the present invention the sorting and feeding operations taking place between the main conveyor system and the dishwasher conveyor were carried out by hand and therefore the efficiency of the entire conveyor and dishwashing system was limited to the capacity of the operators who perform rather unrewarding tasks.

I have found that the human link between the main conveyor system and that of the dishwashing machines can be eliminated by means of a sorting apparatus comprising a pluraliy of vertically aligned paths downwardly inclined and branching from a feed surface, such that when an article is fed at the receiving end of the sorting apparatus its size determines which path will allow downward passage thereof.

It is, therefore, an object of the present invention to provide an apparatus for sorting discrete articles according to their sizes by means of a plurality of inclined channels disposed above one another so that every article of a given range of sizes will follow the same channel towards a discharge point.

Another object of the present invention is to provide channels adapted to adjust the speed of the articles sliding thereon so as to prevent damage to these articles as they reach the discharge end.

A further object of the present invention is to adapt the ends of the channels so as to discharge the articles directly onto a dishwasher conveyor, in a position suitable for proper washing and drying.

Accordingly the present invention provides an apparatus for dimensionally sorting discrete articles advancing sequentially along the center line of a feed surface, comprising a plurality of paths branching from said feed surface and having their longitudinal axes disposed in a vertical plane which contains the center line of said feed surface. Each of the paths includes two elongated support surfaces which are generally horizontally aligned with each other in the transverse direction and have their inner edges parallel and spaced apart by a distance greater than that between the corresponding edges of the next path therebelow but not greater than the width of said next path.

It may be preferable to provide the support surfaces of the paths with means adapted to prevent marking of the articles thereon.

In the drawings which illustrate an embodiment of the present invention:

FIGURE 1 is a schematic representation of a dishwashing arrangement,

FIGURE 2 is an isometric view of a sorting apparatus, and

Figure 3:
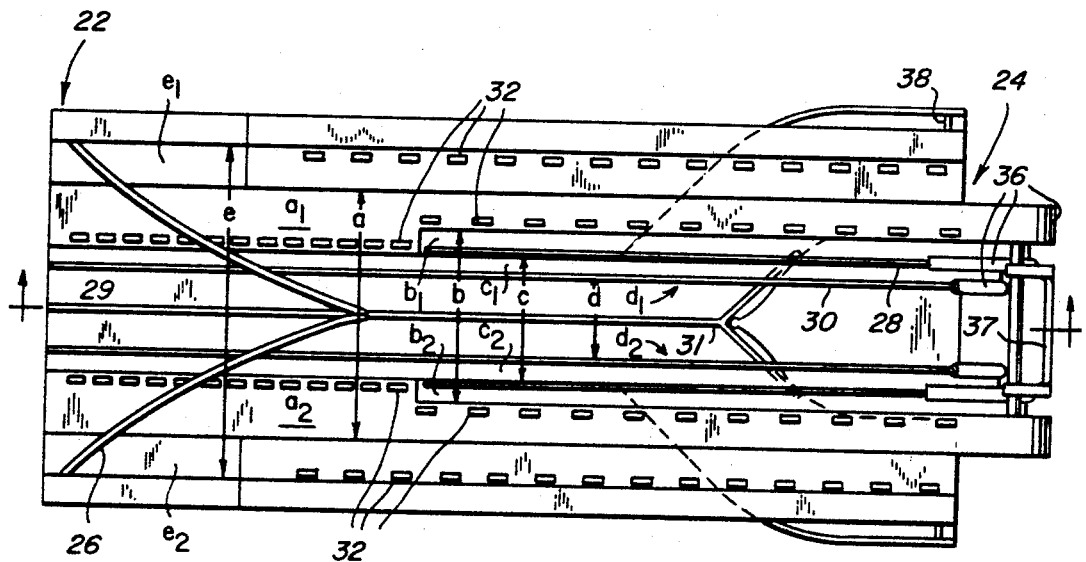
FIGURE 3 is a plan view of the sorting apparatus of FIGURE 2.

Referring to FIGURE 1, reference numeral 10 generally represents a dishwashing arrangement comprising a main conveyor system 12, a sorting apparatus 14, a dishwasher or discharge conveyor 16, a dishwashing machine 18, and an output conveyor 20. In operation the articles to be washed are carried by the main conveyor system 12 to the sorting apparatus 14 where they are sorted according to size ranges and placed on the dishwasher conveyor 16 via paths or channels $a$, $b$, $c$ and $d$. The dishwasher conveyor 16 generally is of the endless rack type and carries the dishes in an upright position through the dishwasher 18 which includes washing, rinsing and drying stations.

Figure 4:
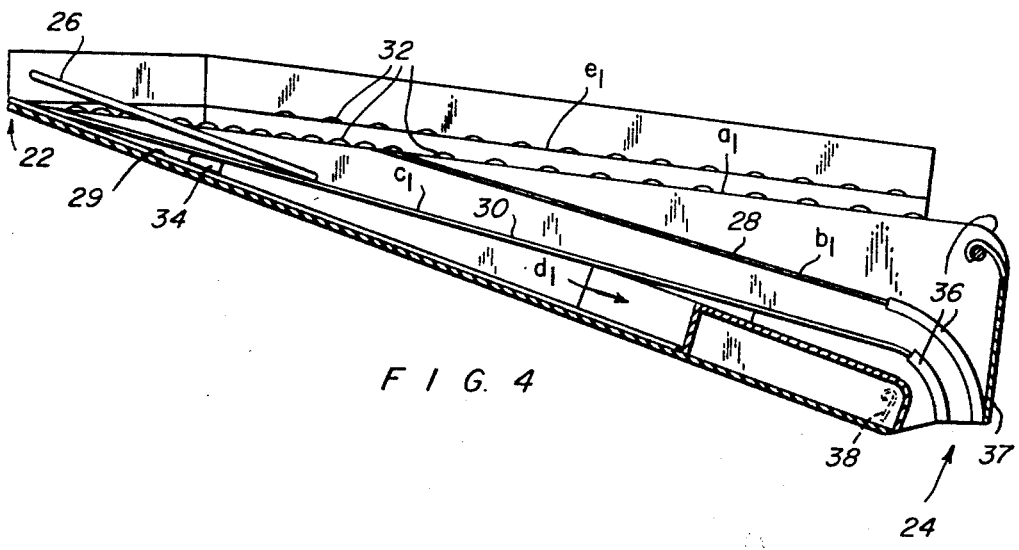
FIGURE 4 is a cross section taken along line IV—IV of FIGURE 3.

The sorting apparatus 14 is represented in greater detail in FIGURES 2 to 4. It comprises a receiving end 22 where paths $a$, $b$, $c$, $d$, and $e$ branch from a feed surface, e.g. end of main conveyor system 12 (FIGURE 1), and extend to a discharge end 24. The paths have their longitudinal axes disposed in a vertical plane which contains the center line of the feed surface, and each of the paths $a$, $b$, $c$ and $e$ includes two elongated support surfaces $a_1$, $a_2$, $b_1$, $b_2$, $c_1$, $c_2$, and $e_1$, and $e_2$. Path $d$ is the bottom surface of the sorting apparatus, and separates into discharge channels $d_1$ and $d_2$. The support surfaces of each path $a$, $b$, $c$, or $e$ are generally horizontally aligned in the direction transverse to their length, and they have their inner edges parallel. The distance between the inner edges of the support surfaces of any of the paths $a$, $b$, $c$, or $e$ is greater than that of the next path below it, but is not greater than the width of that next path. In other words the paths are disposed in the upward direction in order of increasing width, and the widths of the paths are such that the articles except for the small ones will rest on both support surfaces of the paths $a$, $b$, $c$, or $e$. The smaller articles, e.g. cups, glasses and cutlery, follow path $d$. A central ridge 31 in path $d$ tends to distribute the smaller articles left and right to discharge channels $d_1$ and $d_2$. In addition the sorting apparatus includes deflecting means 26 for centering the articles with the center line of the paths. The deflecting means 26 may be in the form of a series of flexible rods connected to the end of th main convyor system 12 or to the receiving end 22 of the sorting apparatus 14. Therefore as an aritcle reaches the receiving end 22 of the sorting apparatus 14, its width determines the path that it will follow to the discharge point of that particular path. Obviously the time required for an article to reach the dishwasher conveyor 16 is determined by the length and the inclination of the path.

In the embodiment illustrated the sorted articles are placed on a single dishwasher conveyor 16 although conceivably more than one such conveyor 16 could be used in certain applications. Moreover the dishwasher conveyor 16 preferably is in the form of a continuous rack, such as flat bed, underslung or peg type. Consequently the sorting apparatus 14 must feed the articles to the dishwasher conveyor 16 at a predetermined angular position and at a suitable speed.

The speed of the articles at the discharge end 24 of the sorting apparatus 14 is particularly important: too low a speed reduces the handling capacity of the conveyors 12 and 18 whereas high speed operation might damage fragile articles. Accordingly the angles and lengths of the paths should be adjusted to suit the requirements of a particular application but speed regulating means such as friction rods or bars 28, 29 and 30 may also be used advantageously for that purpose. Such rods or bars 28, 29, 30 when highly polished may be used for preventing marking of the articles sliding thereon, particularly the medium size ones, whereas the larger and usually heavier plates may be protected by means of rollers 32 preferably made of rubber or the like. Water flowing on the bottom surface of path $d$ can reduce marking of the silverware and other small items, and also flush down any dirt and food leftovers. To that effect one or more water outlets 34 are provided adjacent the surface of the lowermost part.

At the discharge end 24 the paths $a$, $b$, and $c$, which carry trays and plates, are provided with rounded or downwardly curved portions 36 where the trays and plates are tilted and directed toward the rack-like dishwasher conveyor 16. The curved portions of paths $b$ and $c$ may be provided with ridges of rubber or any other suitable material having a high coefficient of friction for braking the plates just before falling onto the conveyor 16, and if deemed necessary further braking and deflection of the plates on paths $b$ and $c$ may be effected by a sheet 37 made of any suitable resilient material such as neoprene type rubber. The lower path $d$ divides into channels $d_1$ and $d_2$ at the ends of which elements 38 are provided for flipping the small items upside down before falling to the right and left side portions of the conveyor 16. Individual racks on path $e$ may be received on a separate conveyor means coupled with the discharge end of path $e$.

Sorting apparatus according to the invention may have straight or curved paths $a$ to $e$ and may be made of any rigid material which can resist corrosion. However for sanitary reasons polished stainless steel is preferable. Obviously the number of paths may be varied and if necessary the feed surface, which in the illustrated embodiment is the feed conveyor 12, might extend as far as the narrowest path.

The main conveyor system 12, partly shown in FIGURE 1, plays an important role in minimizing prewashing operations and in allowing maximum volume flow to the sorter. Therefore in order to take full advantage of the use of a sorter in accordance with this invention it may be preferable to adopt a main conveyor system 12 of the overlap-underlap belt type provided with water spray lubrication particularly in curved sections.

What I claim as my invention is:
1. Apparatus for dimensionally sorting discrete articles advancing sequentially along the center line of a feed surface, comprising a plurality of paths diverging from said feed surface with their longitudinal axes disposed in a vertical plane which contains said center line; each of said paths including two elongated support surfaces which are generally horizontally aligned with each other in the transverse direction and have their inner edges parallel and spaced apart by a distance greater than that between the corresponding edges of the next path therebelow but not greater than the width of said next path, and positively supporting the article on the support surfaces clear of adjacent paths, said support surfaces extending at least a substantial portion of the length of said apparatus to the discharge end thereof, whereby said articles are carried along said paths to said discharge end to be deposited on a carrying means.

2. Apparatus as claimed in claim 1 additionally including deflecting means adjacent said feed surface for centering said articles with respect to said vertical plane.

3. Apparatus as claimed in claim 2 wherein said deflecting means comprises a pair of elongated flexible members disposed in a V-shaped configuration pointing in the direction of movement of said articles.

4. Apparatus as claimed in claim 1 wherein the lowermost path consists of a bottom slide surface.

5. Apparatus as claimed in claim 4 wherein said bottom slide surface is lubricated by means of a flow of water.

6. Apparatus as claimed in claim 4 wherein said lowermost path separates into two discharge channels.

7. Apparatus as claimed in claim 1 wherein some of said paths are adapted to place said articles on a common discharge conveyor which is in the form of an endless rack.

8. Apparatus as claimed in claim 1 additionally comprising rows of rollers disposed along and projecting above the support surfaces of at least one of said paths and being rotatably mounted on horizontal axes transverse to the direction of movement of said articles.

9. Apparatus as claimed in claim 1 additionally comprising longitudinally disposed rods of highly polished metal on the support surfaces of at least one of said paths.

10. Apparatus as claimed in claim 1 wherein said support surfaces and said bottom slide surface are made of polished stainless steel.

References Cited
UNITED STATES PATENTS

| | | | |
|---|---|---|---|
| 2,320,227 | 5/1943 | Frey | 209—99 |
| 2,990,929 | 7/1961 | Attwood | 193—35 |
| 3,251,466 | 5/1966 | Fleishman | 209—99 |
| 3,347,368 | 10/1967 | Morgensen | 209—99 |

M. HENSON WOOD, *Primary Examiner.*

RICHARD A. SCHACHER, *Assistant Examiner.*